United States Patent
Kamiyama et al.

[11] Patent Number: 6,006,787
[45] Date of Patent: Dec. 28, 1999

[54] BRANCH PIPE LINER BAG AND BRANCH PIPE LINING METHOD

[75] Inventors: Takao Kamiyama, Kanagawa-ken; Yasuhiro Yokoshima; Shigeru Endoh, both of Ibaraki-ken; Hiroyuki Aoki, Saitama-ken, all of Japan

[73] Assignees: Shonan Gosei-Jushi Seisakusho K.K., Hiratsuka; Yokoshima & Company; Get Inc., both of Ibaraki-ken; Oar Company, Tokorozawa, all of Japan

[21] Appl. No.: 09/247,995

[22] Filed: Feb. 10, 1999

[30] Foreign Application Priority Data

Feb. 12, 1998 [JP] Japan .................................. 10-029749

[51] Int. Cl.⁶ ..................................................... F16L 55/16
[52] U.S. Cl. ............................... 138/98; 138/97; 264/269; 405/150.1; 156/287
[58] Field of Search ......................... 138/98, 97; 264/269, 264/516, 267; 156/287; 405/150.1

[56] References Cited

U.S. PATENT DOCUMENTS

| | | | |
|---|---|---|---|
| 5,329,063 | 7/1994 | Endoh | 138/98 |
| 5,439,033 | 8/1995 | Kamiyama et al. | 138/98 |
| 5,454,401 | 10/1995 | Kamiyama et al. | 138/98 |
| 5,566,719 | 10/1996 | Kamiyama et al. | 138/98 |
| 5,598,873 | 2/1997 | Kamiyama et al. | 138/98 |
| 5,692,543 | 12/1997 | Wood | 138/98 |
| 5,765,597 | 6/1998 | Kiest, Jr. et al. | 138/98 |

*Primary Examiner*—Patrick Brinson
*Attorney, Agent, or Firm*—Knobbe, Martens, Olson & Bear, LLP

[57] ABSTRACT

A branch pipe liner bag is provided for reliably lining a branch pipe even having a curved portion. The branch pipe liner bag has a tubular resin-absorbent material having a flange formed at one end thereof, the outer surface of which is covered with a highly air-tight film. The tubular resin-absorbent material is impregnated with an unhardened hard-enable resin, and a separable tube is attached to the flange. According to this invention, since the separable tube is attached to the previously hardened flange of the branch pipe liner bag, the separable tube will never be torn or cut even if the branch pipe liner bag is everted and inserted into a branch pipe having a curved portion with a high fluid pressure, or even if the film covering the branch pipe liner bag is heated and therefore softened by a heat medium or heat generated by the hardening of the thermosetting resin. It is therefore possible to reliably line a branch pipe even having a curved portion, using the branch pipe liner bag, and repair the branch pipe.

19 Claims, 15 Drawing Sheets

BRANCH PIPE LINER BAG AND BRANCH PIPE LINING METHOD

BACKGROUND OF THE INVENTION

1. Field of the Invention

This invention relates generally to branch pipe lining techniques, and more particularly, to a branch pipe liner bag for lining an inner wall of a branch pipe which joins a main pipe. This invention is also relates to a branch pipe lining method which uses the branch pipe liner bag.

2. Description of the Related Art

When an underground pipe, such as pipelines and passageways, becomes defective or too old to perform properly, the pipe is repaired and rehabilitated without digging the earth to the pipe and disassembling the sections of the pipe. This non-digging method of repairing an underground pipe has been known and practiced commonly in the field of civil engineering. The pipe lining method utilizes a tubular pipe liner bag made of a resin-absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner is pressed against the inner wall of the pipe by a pressurized air, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections. The foregoing pipe lining method can be similarly applied to the lining of a main pipe of sewerage pipes or the like and a branch pipe branched off the main pipe.

A specific example of the conventional branch pipe lining method will be described with reference to FIGS. 16 and 17.

FIGS. 16 and 17 are cross-sectional views illustrating steps of a conventional branch pipe lining method. A branch pipe 131, a main pipe 130 in which a robot 122, a pressure bag 123 and other necessary tools and materials have been introduced. A branch pipe liner bag 101 has been inserted in the pressure bag 123.

The branch pipe liner bag 101 has a tubular resin-absorbent material having a flange 101A formed at one end, and impregnated with unhardened liquid hardenable resin. Near the flange 101A of the tubular resin-absorbent material, one end of a separable tube 140 is temporarily adhered such that the separable tube 140 can be torn off. The branch pipe liner bag 101 has the flange 101A carried on a collar 124 supported by the above-mentioned robot 122, and an uneverted portion of the resin-absorbent material except for the flange 101A has been inserted in the pressure bag 123.

An open end of the separable tube 140 attached to the branch pipe liner bag 101 is coupled to the pressure-bag 123 through a socket 128, and the collar 124 and the socket 128 are coupled by an elbow bag 129.

In operation, the robot 122 is driven to move the collar 124 upward to bring the flange 101A of the branch pipe liner bag 101 into close contact with the periphery of a branch pipe opening of the main pipe 130 (a portion of the main pipe 130 open to the branch pipe 131). Then pressurized air is supplied into a closed space S formed within the pressure bag 123 by the branch pipe liner bag 101 and the separable tube 140, causing the branch pipe liner bag 101 to be everted and inserted into the branch pipe 131 from the main pipe 130 toward the ground by the pressure of the air, as illustrated in FIG. 16. In this event, the separable tube 140 serves as a seal for air-tight sealing the branch pipe liner bag 101 and the pressure bag 123 to prevent the pressurized air within the closed space S from leaking.

Once the branch pipe liner bag 101 has been everted and inserted into the branch pipe 131 as described above, the hardenable resin impregnated in the branch pipe liner bag 101 is hardened with the branch pipe liner bag 101 remaining pressed onto the inner wall of the branch pipe 131, thus lining the branch pipe 131 with the hardened branch pipe liner bag 101. In this way, the branch pipe 131 is repaired.

Afterwards, the collar 124 is moved downward, and the flange 101A of the branch pipe liner bag 101 is removed from the collar 124, as illustrated in FIG. 17. Then, the pressure bag 123 and the robot 122 are pulled, for example, in a direction indicated by the arrow, causing the separable tube 140, which has been temporarily adhered to the tubular resin-absorbent material of the branch pipe liner bag 101, to be torn off the temporarily adhered portion of the tubular resin absorbent material. Then, the separable tube 140 is removed from the main pipe 130 together with the pressure bag 123 and the robot 122, thus completing a sequence of lining operations for the branch pipe 131.

Actually, however, branch pipes often have bent or curved portions. For passing a branch pipe liner bag through such a curved portion of a branch pipe, this requires a large everting pressure approximately five to ten times higher than that required for passing the branch pipe liner bag through a straight portion of a branch pipe. When the branch pipe liner bag is everted by applying a high everting pressure thereto for passing the branch pipe liner bag through a curved portion, a separable tube temporarily adhered thereto also receives large pressure and is possibly torn off the temporarily adhered portion.

To solve this problem, it is contemplated that a larger temporarily adhering force is provided for the separable tube. However, a larger temporarily adhering force, if provided for the separable tube, would result in a problem that the separable tube is not torn off the temporarily adhered portion, but instead the separable tube itself is broken in the middle.

As an alternative, when the separable tube is made stronger so as to prevent the same from breaking in the middle, a softened plastic-film, heated by a heat medium used for heating the thermosetting resin and heat generated by the hardening of the thermosetting resin, is peeled off the surface of the hardened tubular resin-absorbent material.

OBJECT OF THE INVENTION

This invention has been made in view of the problems mentioned above.

It is, therefore, a principal object of this invention to provide an improved branch pipe liner bag.

It is another object of this invention is to provide a branch pipe liner bag which is capable of reliably lining branch pipe even having a curved portion.

It is a further object of this invention is to provide a branch pipe lining method utilizing the branch pipe liner bag.

SUMMARY OF THE INVENTION

This invention is adapted to be embodied in a branch pipe liner bag. The branch pipe liner bag comprises a tubular resin-absorbent material having a flange formed at one end thereof, the outer surface of the tubular resin-absorbent material being covered with an fluid-tight film, the tubular resin-absorbent material being impregnated with an unhardened hardenable resin and a separable tube attached to said flange.

This invention is also adapted to be embodied in a branch pipe lining method. The branch pipe lining method employs a branch pipe liner bag having a tubular resin-absorbent material with a flange formed at one end thereof, wherein the outer surface of the tubular resin-absorbent material is covered with an fluid-tight film, and the tubular resin-absorbent material is impregnated with an unhardened hardenable resin, and a separable tube attached to said flange. The method comprises the steps of fluid-tight coupling an open end of said separable tube of said branch pipe liner bag to an open end of a pressure bag to form a closed space within said pressure bag, bringing said flange of said branch pipe liner bag into close contact with a periphery of a branch pipe opening of a main pipe, supplying a pressurized fluid into said closed space, with said flange being fitted into said branch pipe opening, to evert and insert said branch pipe liner bag into the branch pipe from the main pipe toward the ground, hardening the hardenable resin impregnated in said branch pipe liner bag with the inserted branch pipe liner bag being pressed onto an inner wall of the branch pipe, and separating said separable tube from the vicinity of said flange.

Thus, according to this invention, the separable tube is attached to the previously hardened flange of the branch pipe liner bag, so that the separable tube will not be torn or cut even if the branch pipe liner bag is everted and inserted into a branch pipe having a curved portion with a high fluid pressure or even if the film covering the branch pipe liner bag is heated and therefore softened by a heat medium or heat generated by the hardening of the thermosetting resin. It is therefore feasible to reliably line a branch pipe even having a curved portion, employing the branch pipe liner bag, and repair the branch pipe.

The above and other objects, features, and advantages of this invention will become apparent from the following detailed description of the preferred embodiments thereof when read in conjunction with the accompanying drawings.

DETAILED DESCRIPTION OF THE PREFERRED EMBODIMENT

This invention will hereinafter be described in connection with several preferred embodiments thereof with reference to the accompanying drawings.

First Embodiment

Figure 1:
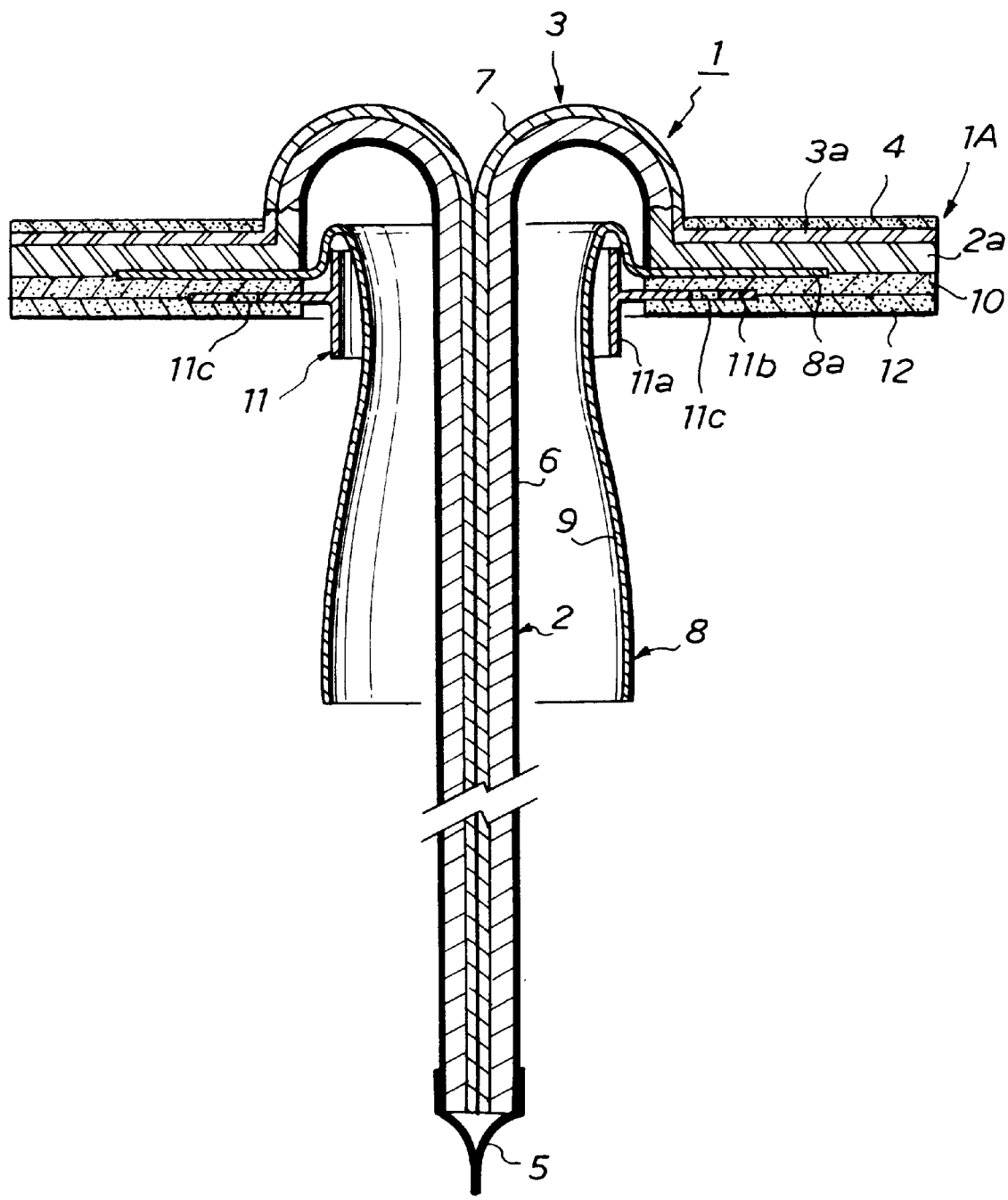
FIG. 1 is a cross-sectional view of a branch pipe liner bag according to a first embodiment of this invention.

Referring to FIG. 1 showing a cross-sectional view of a branch pipe liner bag 1, the branch pipe liner bag 1 has a two-layer structure consisting of an inner liner 2 and an outer liner 3. These inner liner 2 and outer liner 3 may be made of unwoven fabric. One end of each of the liners 2, 3 is folded out to form flange 2a or 3a. The flange 3a of the outer liner 3 is sandwiched between the flange 2a of the inner liner 2 and a ring-like resin-absorbent material 4, and they are integrally bonded to each other. Also, the other ends (everted ends) of the inner liner 2 and the outer liner 3 are sealed by a highly air-tight plastic film 5.

Then, except for the flanges 2a, 3a of the respective tubular resin-absorbent materials constituting the inner liner 2 and the outer liner 3, an unhardened liquid thermosetting resin is impregnated into the inner and outer liners 2, 3. In addition, these resin impregnated portions have their outer surfaces covered with highly air-tight plastic films 6, 7, respectively. A material for the unwoven fabric constituting the tubular resin-absorbent materials may be selected from polyester, polypropylene, acrylic fabric, vinyl and so on. For the thermosetting resin impregnated into the tubular resin-absorbent materials, unsaturated polyester resin, epoxy resin or the like may be used. Also, as a material for the plastic films 5–7, polyurethane, polyethylene, polyethylene/nylon copolymer, vinyl chloride or the like may be selected.

Referring further to FIG. 1, a separable tube 8 is made of a tubular resin-absorbent material which has one end folded out to form a flange 8a The tubular resin-absorbent material has the inner wall covered with a highly air-tight plastic film 9 except for the flange 8a. The flange 8a formed at the one end of the separable tube 8 is sandwiched between the flange 2a of the inner liner 2 and a ring-like resin-absorbent material 10 abutting to the lower surface of the flange 8a. In this way, the flange 8a is attached to the flange 2a of the inner liner 2.

Also, in FIG. 1, an anti-piercing protector 11, made of a metal (for example, a stainless steel), is formed of a cylinder 11a for protecting an inner surface adjacent to the flange 2a of the resin-absorbent material of the inner liner 2, and a ring-like flange 11b formed around the outer surface of the cylinder 11a. The flange 11b is formed with a plurality of apertures 11c (see FIG. 2). The anti-piercing protector 11 is attached to the flange 2a of the inner liner 2 by sandwiching the flange 11b between the resin-absorbent material 10 and another resin-absorbent material 12.

The resin-absorbent material of the separable tube 8 as well as the resin-absorbent materials 4, 10, 12 may be made of a similar material to that of the resin-absorbent material of the inner liner 2 and the outer liner 3. Also, the plastic film 9 may be made of a similar material to that of the plastic films 6, 7 of the inner liner 2 and the outer liner 3.

It should be noted that the flanges 2a, 3a, 8a of the inner liner 2, the outer liner 3 and the separable tube 8 as well as the resin-absorbent materials 4, 10, 12 form arcuate surfaces with a curvature equal to the curvature of the inner wall of a main pipe (see FIG. 9), later described, and their outer diameters are larger than the inner diameter of a branch pipe 31 (see FIG. 9), later described. Then, these flanges 2a, 3a, 8a and the resin-absorbent materials 4, 10, 12 are integrally bonded by hardening the hardenable resin impregnated therein to form a single flange 1A which holds an arcuate surface having a curvature equal to that of the inner wall of the main pipe (see FIG. 9).

Method of Manufacturing Branch Pipe Liner Bag

Figure 2:
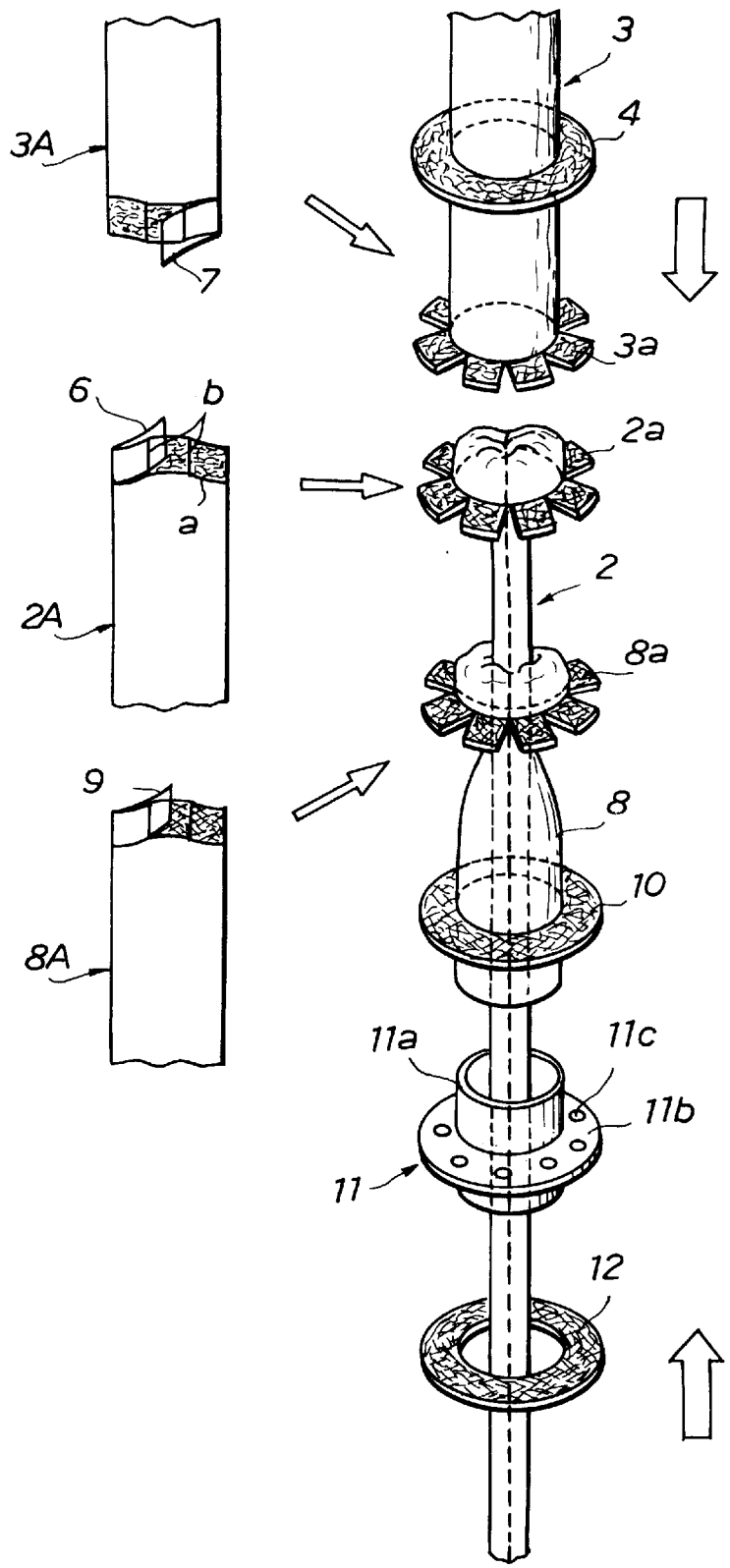
FIG. 2 is a perspective view illustrating a method of manufacturing the branch pipe liner bag according to the first embodiment of this invention.
Figure 3:
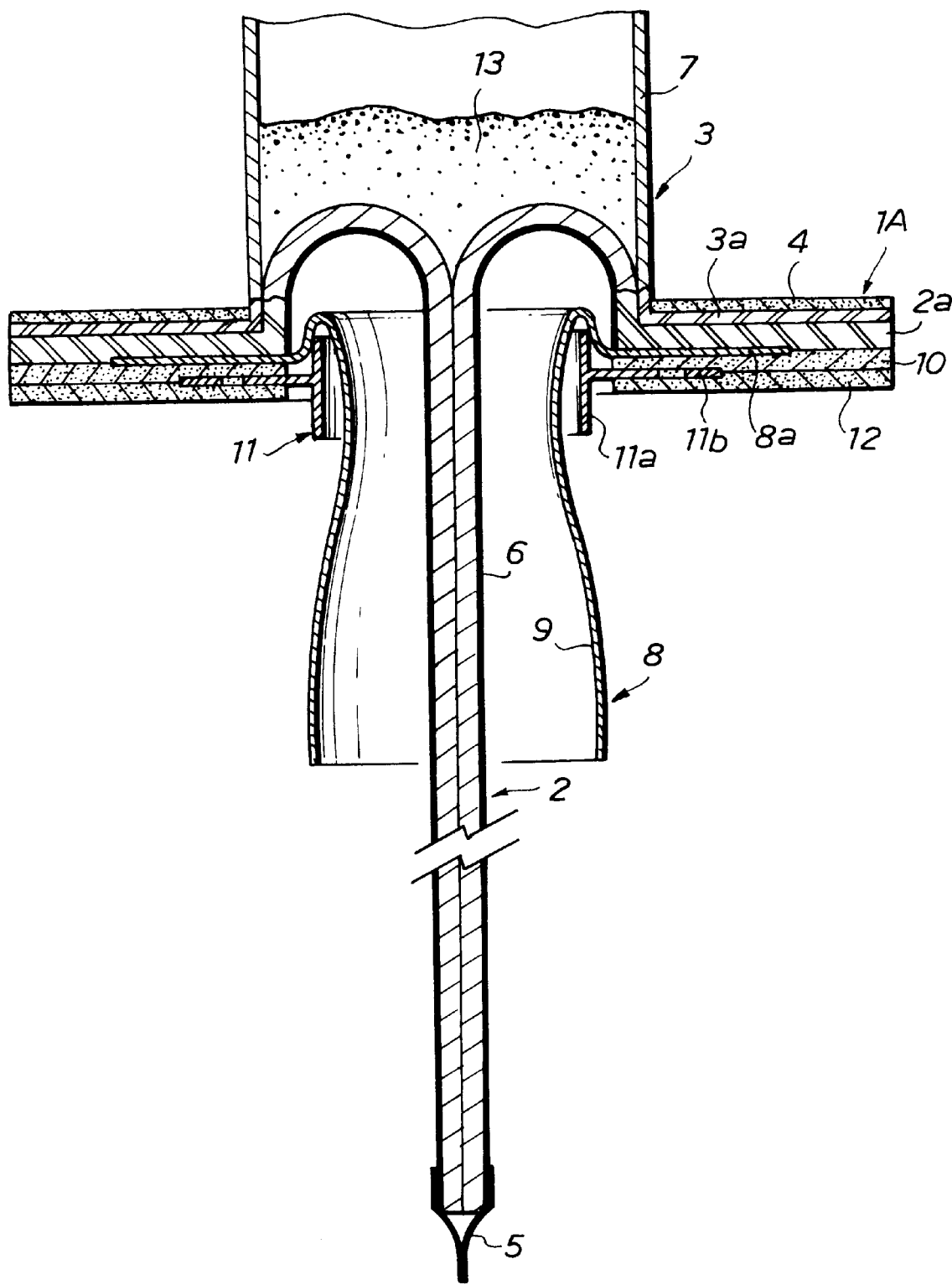
FIGS. 3 and 4 are cross-sectional views illustrating steps of the method of manufacturing the branch pipe liner bag according to the first embodiment of this invention.
Figure 4:
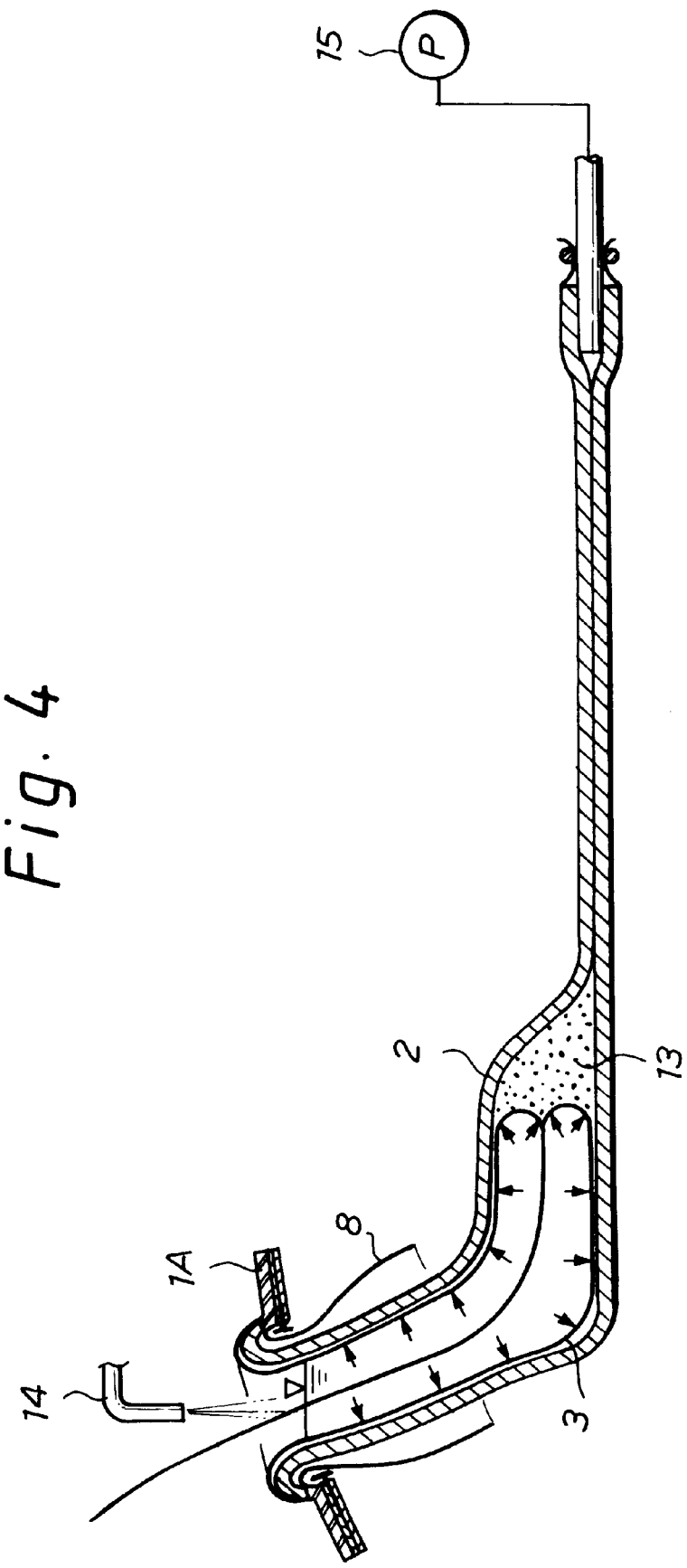

Next, a method of manufacturing the branch pipe liner bag 1 having the structure as described above will be described with reference to FIGS. 2–4. FIG. 2 is a perspective view illustrating the method of manufacturing the branch pipe liner bag 1, and FIGS. 3 and 4 are cross-sectional views also illustrating the method.

Referring first to FIG. 2, an end portion of a pipe liner bag (tubular unwoven fabric having the outer surface covered with a plastic film 6) 2A, serving as a material of the inner liner 2, is cut conformal with the shape of the inner wall of the main pipe (see FIG. 9), and portions of the plastic film 6 covered over the outer surface of the pipe liner bag 2A are torn off along a curved cut line which goes along the shape of the inner wall of the main pipe 30 by an appropriate width.

Next, the end portion of the tubular resin-absorbent material of the pipe liner bag 2A, from which the plastic film 6 has been torn, is slit at a plurality of positions at appropriate intervals all along the periphery in the lengthwise direction (in the vertical direction in FIG. 2). The slit portion is then folded out to extend outwardly, resulting in slits b opening in the radial direction to form the flange 2a. In this way, the inner liner 2 is fabricated.

A pipe liner bag (tubular unwoven fabric having the outer surface covered with a plastic film 7) 3A, serving as a material of the outer liner 3, and a pipe liner bag (tubular unwoven fabric having the outer surface covered with a plastic film 9) 8A, serving as a material of the separable tube 8 are also processed in a manner similar to the foregoing to form the flange portions 3a, 8a, radially opened, at their ends, thus fabricating the outer liner 3 and the separable tube 8.

Then, the separable tube 8 is set with its flange 8a positioned at the top, and the inner liner 2 having the flange 2a likewise positioned at the top is inserted into the separable tube 8 from the above. Then the flanges 2a, 8a of both are aligned. Next, the flange 3a of the outer liner 3, positioned at the bottom, is stacked on the flange 2a of the inner liner 2, the tubular resin-absorbent material 4 inserted into the outer liner 3 is stacked on the flange 3a of the outer liner 3 on the flange 8a of the separable tube 8, the separable tube 8, the resin-absorbent material 10 inserted into the inner liner 8, the anti-piercing protector 11, and the resin-absorbent material 12 are stacked in sequence. As illustrated in FIG. 3, the separable tube 8 has the flange 8a sandwiched by the flange 2a of the inner liner 2 and the resin-absorbent material 10, while the anti-piercing protector 11 is sandwiched by the two upper and lower resin-absorbent materials 10, 12.

In the state illustrated in FIG. 3, the resin-absorbent materials 4, 10, 12, the flanges 2a, 3a of the inner liner 2 and the outer liner 3, and the flange 8a of the separable tube 8 are impregnated with a hardenable resin. Then, the impregnated hardenable resin is hardened to form the single flange 1A having a curved surface with a curvature equal to the curvature of the inner wall of the main pipe 30, as described above. Then, the separable tube 8 and the anti-piercing protector 11 are attached to this flange 1A.

Once the flange 1A has been formed as described above, a predetermined amount of unhardened thermosetting resin 13 is poured into the outer liner 3 from the opening at the upper end of the outer liner 3. After the thermosetting resin 13 has been poured into the outer liner 3, a portion of the outer liner 3 is folded inside, and water is poured into the folded portion from a hose 14 as illustrated in FIG. 4. Simultaneously, a distal end (everted end) of the inner liner 2 is connected to a vacuum pump 15, and the inner liner 2 is decompressed to a vacuum by the vacuum pump 15.

As a result, the outer liner 3 is everted and inserted into the inner liner 2 by the pressure of the water to bring the thermosetting resin 13 toward the distal end of the inner liner 2, so that the thermosetting resin 13 is gradually impregnated into the respective tubular resin-absorbent material of the vacuumed inner liner 2 and the everted outer liner 3. Then, as the outer liner 3 has been completely everted and inserted into the inner liner 2, a portion of the outer liner 3 extending from the distal end of the inner liner 2 is cut away, and the water poured into the outer liner 3 is discharged. Then, the respective distal ends of the inner liner 2 and the outer liner 3 are sealed with a plastic film 5, thus completing the branch pipe liner bag 1 illustrated in FIG. 1.

Second Embodiment

Figure 5:
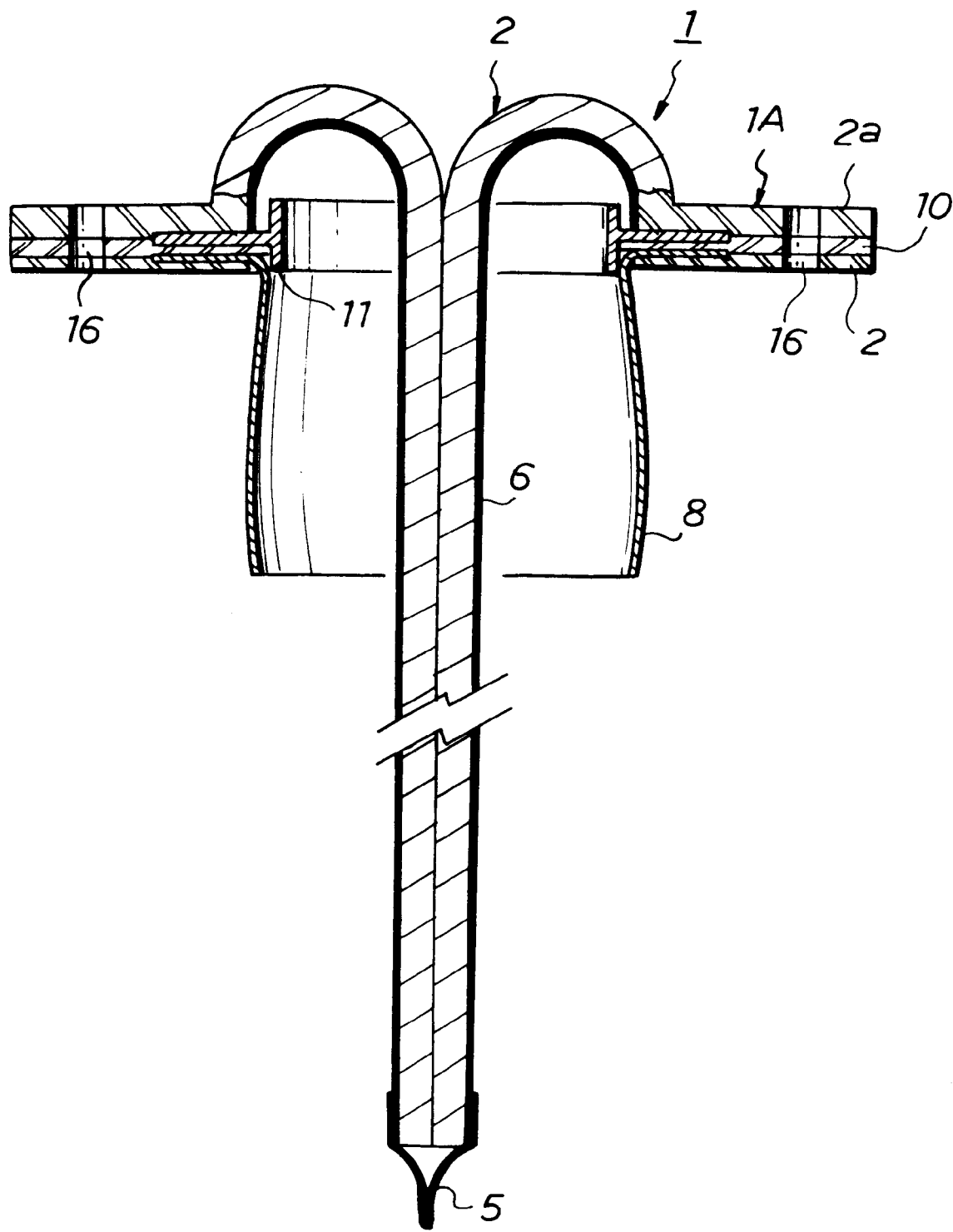
FIG. 5 is a cross-sectional view illustrating a branch pipe liner bag according to a second embodiment of this invention.

Next, a branch pipe liner bag according to a second embodiment of this invention will be described with reference to FIG. 5 showing a cross-sectional view of a branch-pipe liner bag 1. The branch pipe liner bag I is mainly formed of a single-layer tubular resin-absorbent material 2. The tubular resin-absorbent material 2 has one end folded out, as illustrated, to form a hardened flange 2a. The tubular resin-absorbent material 2 except for the flange 2a is impregnated with an unhardened thermosetting resin. In addition, the resin-impregnated portion of the tubular resin-absorbent material 2 has the outer surface covered with a highly air-tight plastic film 6.

The flange 2a is formed with a plurality of apertures 16. Also, the tubular resin-absorbent material 2 has a distal end (everted end) sealed with a highly air-tight plastic film 5.

In the branch pipe liner bag 1 according to the second embodiment, a similar separable tube 8 and anti-piercing protector 11 are sandwiched by ring-like resin absorbent-materials 10, 12, and attached to the flange 2a, as is the case of the aforementioned first embodiment. Then, the flange 2a and the resin-absorbent materials 10, 12 are integrally bonded by a hardened hardenable resin impregnated therein to form a flange 1A of the branch pipe liner bag 1. The flange 1A is formed with an arcuate surface having a curvature equal to the curvature of the inner wall of a main pipe 30 (see FIG. 9).

Third Embodiment

Figure 6:
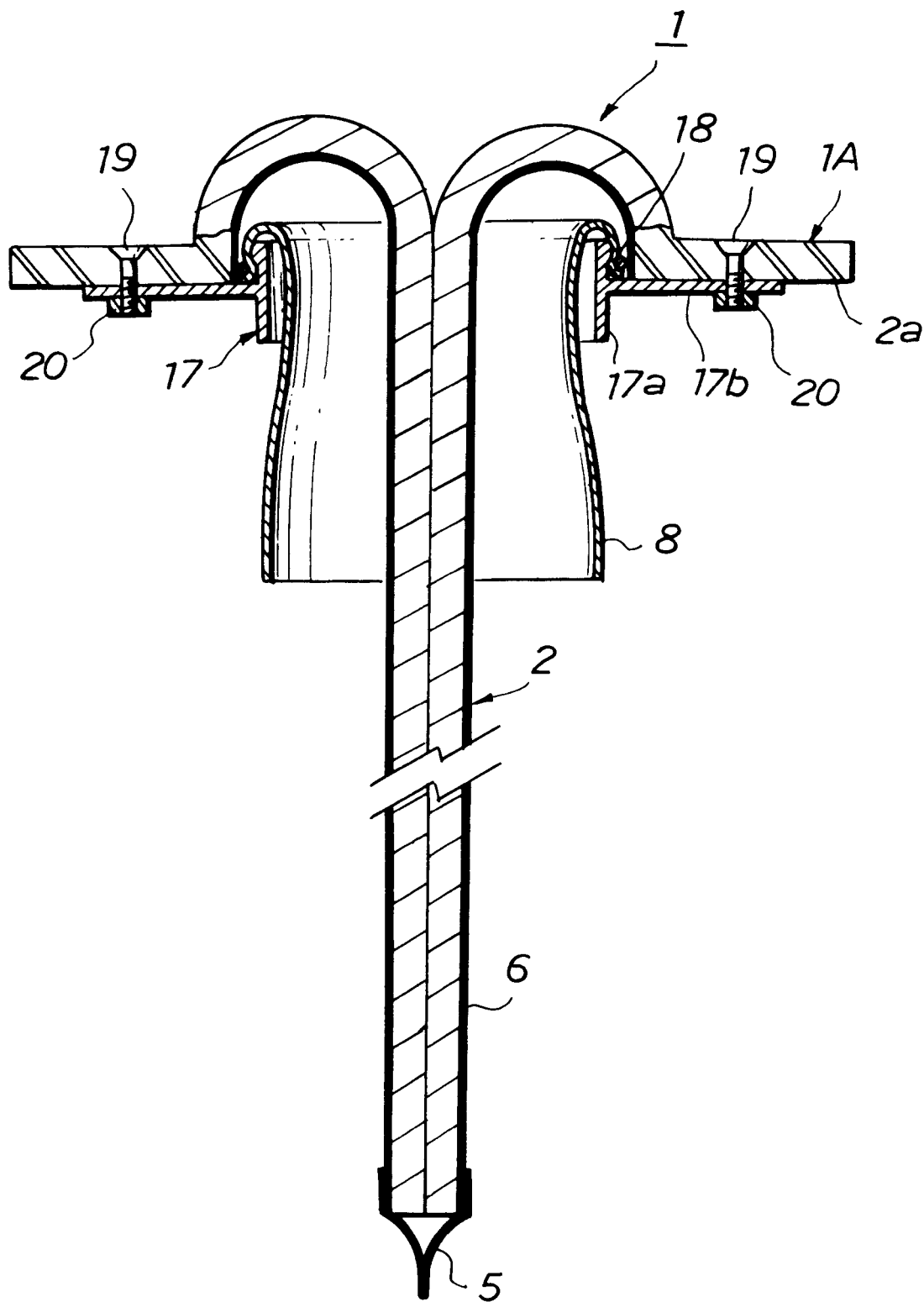
FIG. 6 is a cross-sectional view illustrating a branch pipe liner bag according to a third embodiment of this invention.

Next, a branch pipe liner bag according to a third embodiment of this invention will be described with reference to FIG. 6. FIG. 6 is a cross-sectional view illustrating a branch-pipe liner bag 1 according to the third embodiment of this invention, wherein elements identical to those illustrated in FIG. 5 are designated the same reference numerals, and therefore description thereon will be omitted below.

In the branch pipe liner bag 1 according to the third embodiment, one end of a separable tube 8, folded outwardly, is attached to the periphery of an upper portion of a cylinder 17a, forming part of a metal attachment 17, with a fastening band 18, and a flange 17b of the attachment 17 is brought into contact with the lower surface of the flange 2a, and secured thereto with a plurality of bolts 18 and nuts 20. In other words, the separable tube 8 is attached to the flange 2a through the attachment 17 which is a separate member.

As is the case of the second embodiment, the flange 2a may be formed with a plurality of apertures.

Fourth Embodiment

Figure 7:
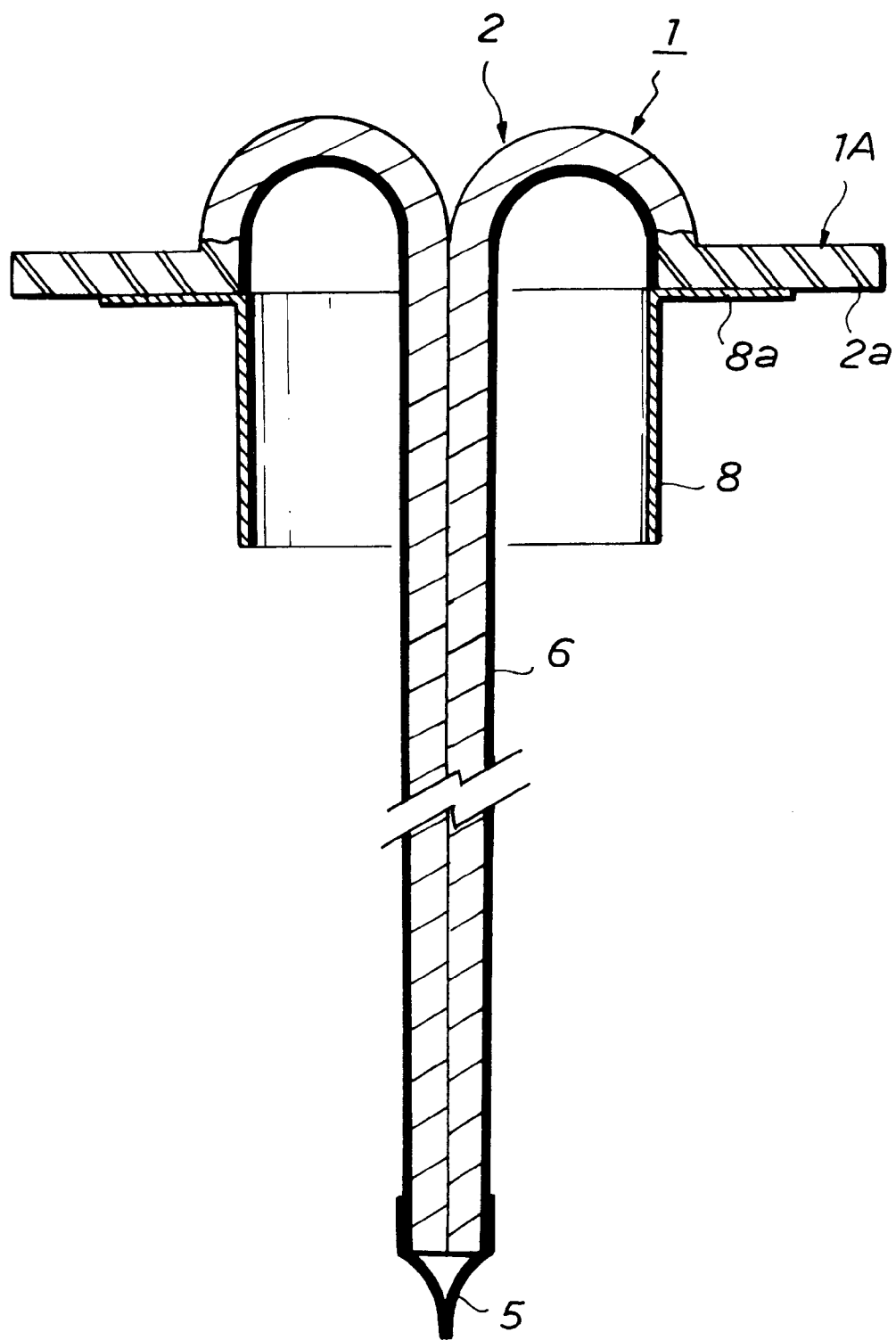
FIG. 7 is a cross-sectional view illustrating a branch pipe liner bag according to a fourth embodiment of this invention.

Next, a branch pipe liner bag according to a fourth embodiment of this invention will be described with reference to FIG. 7. FIG. 7 is a cross-sectional view illustrating a branch pipe liner bag 1 according to the fourth embodiment of this invention, wherein elements identical to those illustrated in FIG. 5 are designated the same reference numerals, and therefore description thereon will be omitted below.

In the branch pipe liner bag 1 according to this embodiment, a flange 8a formed by folding one end of a separable tube 8 outwardly is adhered to the lower surface of a flange 2a formed at one end of a tubular resin-absorbent material 2 with an adhesive, thereby attaching the separable tube 8 directly to the flange 2a.

As is the case of the second embodiment, the flange 2a may be formed with a plurality of apertures.

Fifth Embodiment

Figure 8:
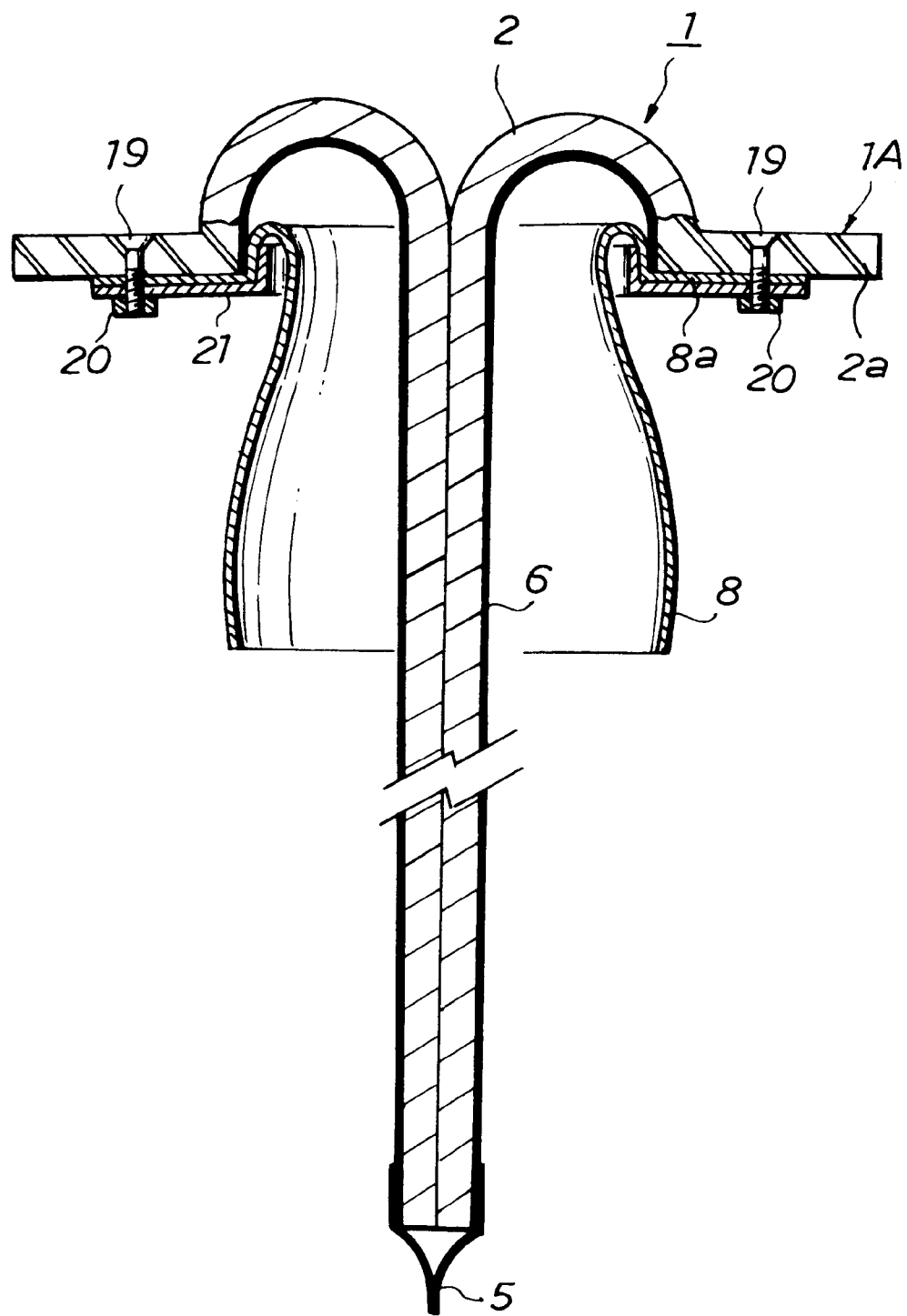
FIG. 8 is a cross-sectional view illustrating a branch pipe liner bag according to a fifth embodiment of this invention.

Next, a branch pipe liner bag according to a fifth embodiment of this invention will be described with reference to FIG. 8. FIG. 8 is a cross-sectional view illustrating a branch pipe liner bag according to the fifth embodiment of this invention, wherein elements identical to those in FIG. 5 are designated the same reference numerals, and therefore description thereon will be omitted below.

In the branch pipe liner bag according to this embodiment, a flange 8a formed by folding one end of a separable tube 8 outwardly is sandwiched between a flange 2a of a tubular resin-absorbent material and a metal sandwiching member 21, which also functions as an anti-piercing protector. Then, the sandwiching member 21 is secured to the lower surface of the flange 2a of the tubular resin-absorbent material with a plurality of nuts 19 and bolts 20, thus attaching the one end of the separable tube 8 to the flange 2a of the tubular resin-absorbent material 2.

As is the case of the second embodiment, the flange 2a may be formed with a plurality of apertures.

Branch Pipe Lining Method

Next, a branch pipe lining method, implemented using the foregoing branch pipe liner bag 1 according to this invention, will be described with reference to FIGS. 9–13 showing cross-sectional views illustrating in order various steps of the branch pipe lining method according to this invention. A main pipe 30, such as a sewerage pipe or the like, has a branch pipe, having a smaller diameter, confluent thereto. In the mainpipe 30, a robot 22 previously assembled on the ground, a pressure bag 23, the branch pipe liner bag 1 and so on have been introduced for the operation and set ready for the pipe lining operation.

The robot 22 is hydraulically driven to advance and retract its head in the directions indicated by arrows &, b, and rotate the head in the directions indicated by arrows c in FIG. 6. The flange-like setting collar 24 is supported by the head. A TV camera 25 is installed on the top of the robot 22. The TV camera 25 is electrically connected to a TV monitor, not shown, installed on the ground through an electrical cable 26.

In addition, a pull rope 27, extending to the ground, is attached to the robot 22.

The branch pipe liner bag 1 has its flange 1A set on the collar 24 of the robot 24, while the-remaining uneverted portion (the portion of the tubular resin-absorbent material except for the flange 2a and the separable tube 8) is accommodated in the pressure bag 23 through the collar 24 one open end of the pressure bag 23 is attached to one end of the socket 28, and one end of the elbow bag 29 and one end of the separable tube 8 are attached to the other end of the socket 28. The elbow bag 29 and the separable tube 8 have the other ends attached to the collar 24. Therefore, a closed spaces defined by the branch pipe liner bag 1 is formed within the pressure bag 23 and the elbow bag 29, and a highly airtight sealing is ensured between the flange 1A of the branch pipe liner bag 1 and the collar 24 by the separable tube 8. The length of the elbow bag 29 is set shorter than the length of the separable tube 8.

Figure 9:
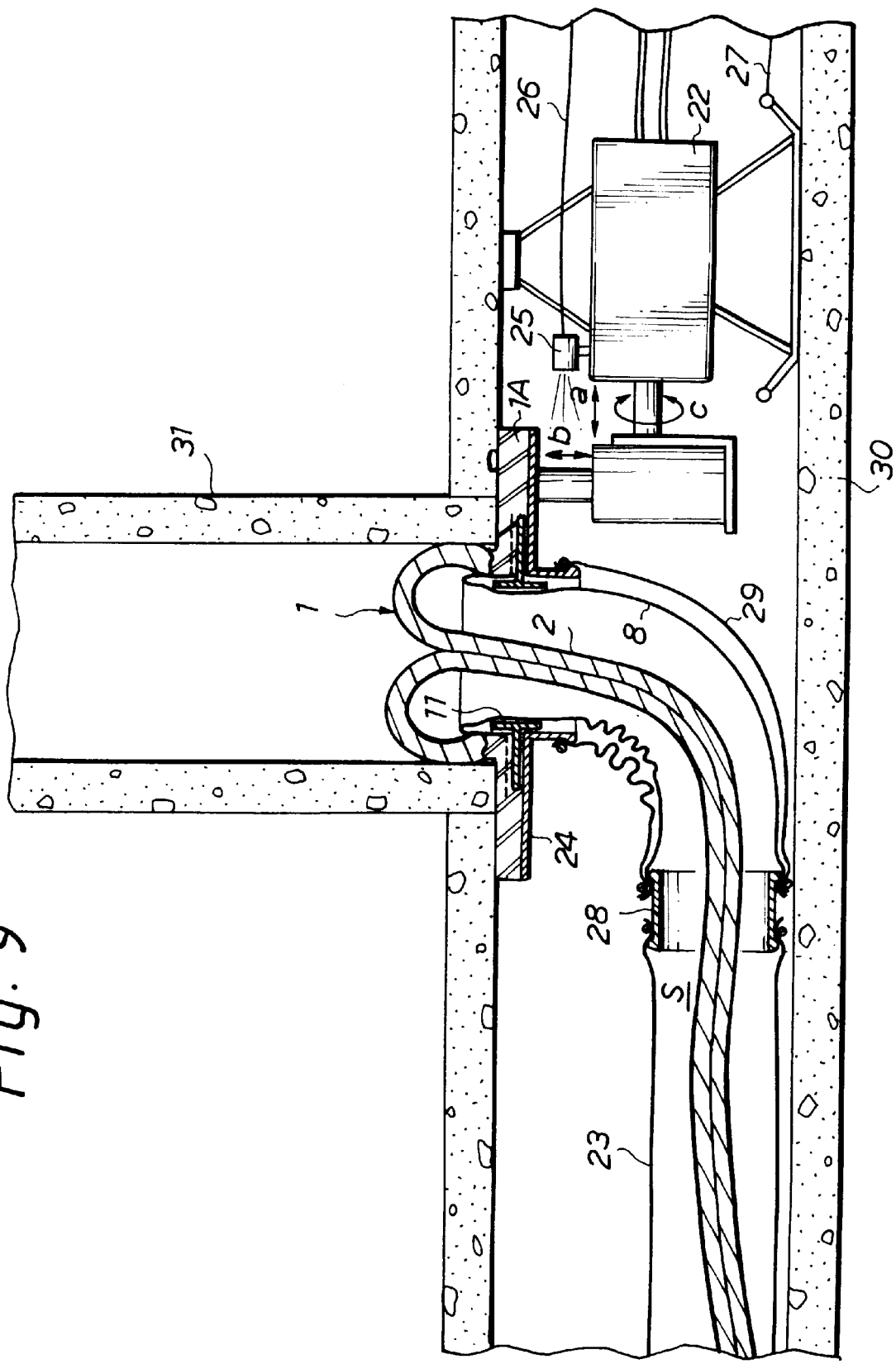
FIGS. 9–13 are cross-sectional views illustrating in order various steps of a branch pipe lining method according to an embodiment of this invention.
Figure 10:
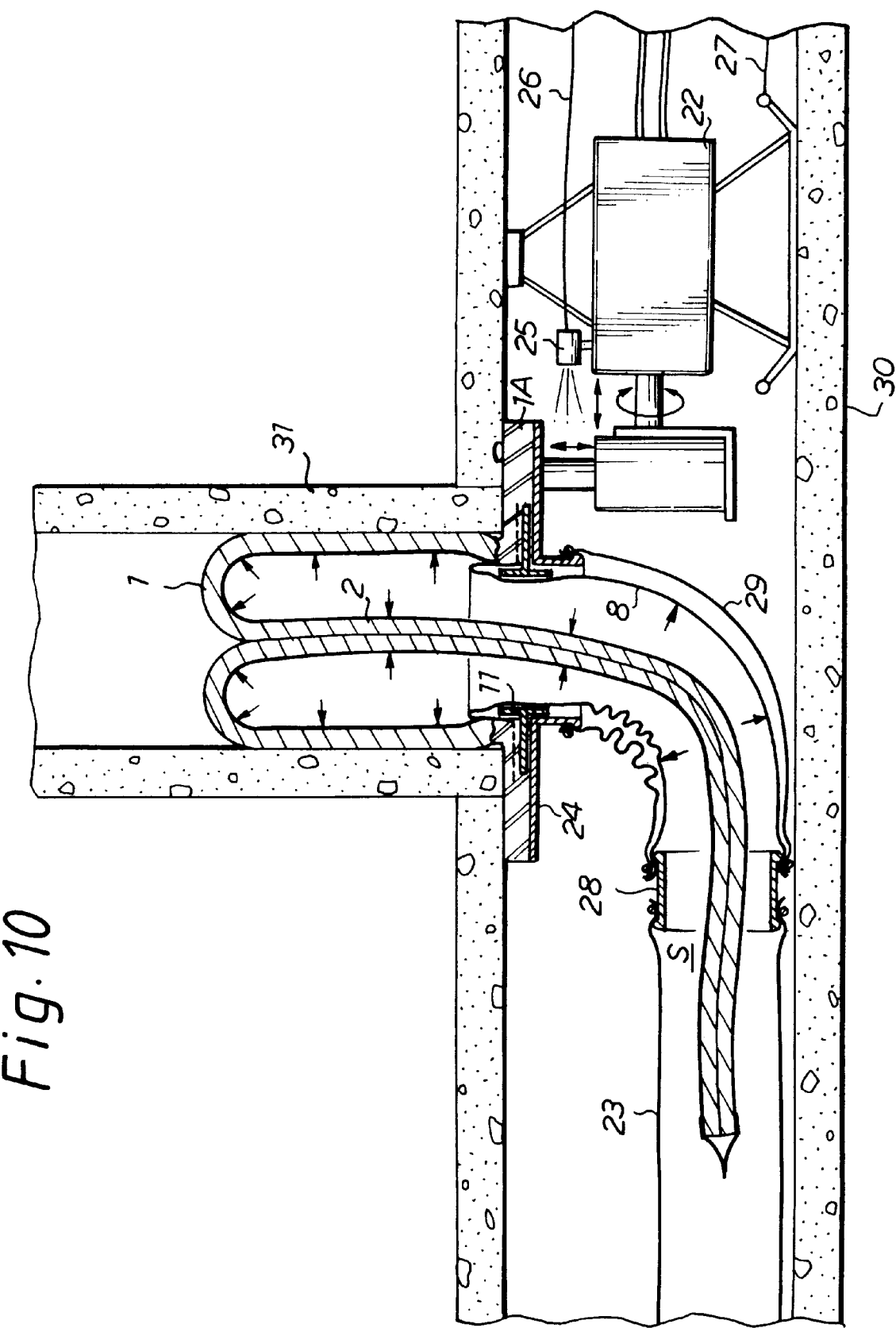

With the construction described above, the pull rope 27 or the pressure bag 23 is pulled to integrally move the robot 22, the branch pipe liner bag 1 supported thereby, the pressure bag 23 and so on within the main pipe 30. While the situation within the main pipe 30 is being monitored on the TV monitor unit (not shown) on the ground through the TV camera 25, the flange 1A of the branch pipe liner bag 1 is positioned at an opening of the branch pipe 31, as illustrated in FIG. 9. Then, the head of the robot 22 is moved upward to press the flange 1A of the branch pipe liner bag 1 onto the peripheral wall of a branch pipe opening of the main pipe 30 (a portion of the main pipe 30 open to the branch pipe 31), thus causing a close contact between the flange 1A and the peripheral wall.

Next, as a compressor, not shown, installed on the ground is driven to supply the closed space S with compressed air, the branch pipe liner bag 1, receiving the pressure of the compressed air, is everted and gradually inserted into the branch-pipe 31 from the main pipe 30 to the ground (upward).

Figure 11:
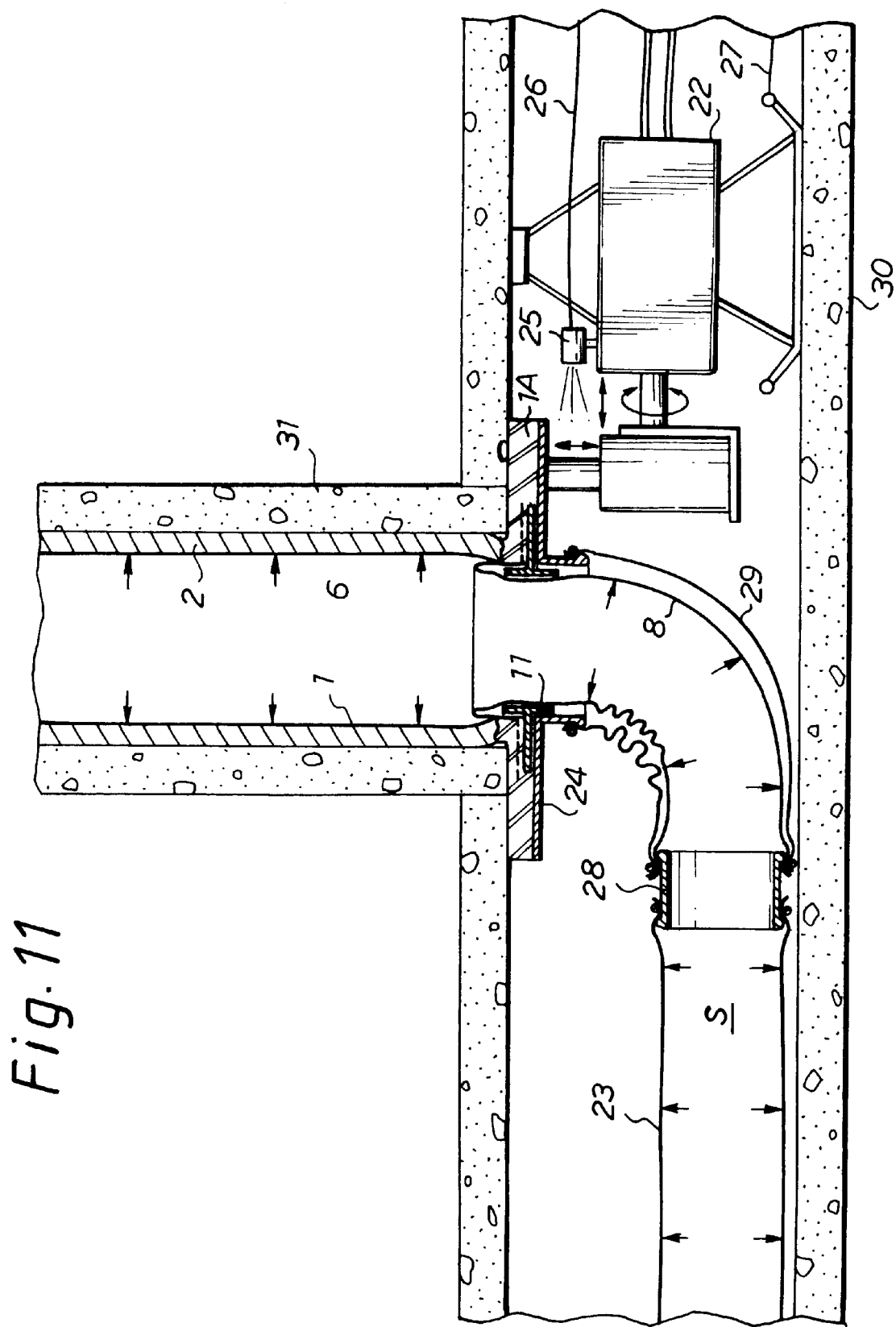
Figure 16:
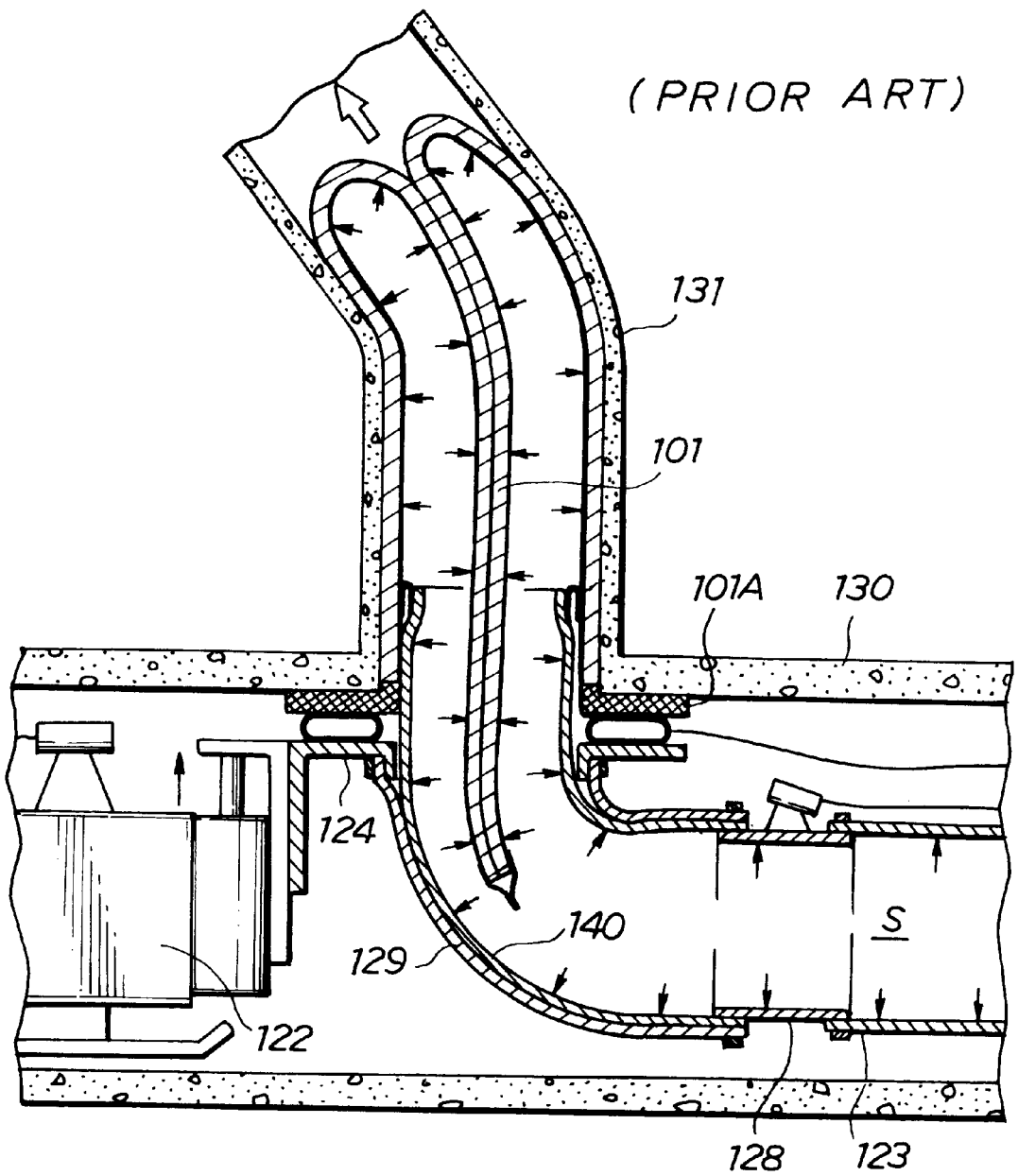
FIGS. 16 and 17 are cross-sectional views illustrating steps of a conventional branch pipe lining method.
Figure 17:
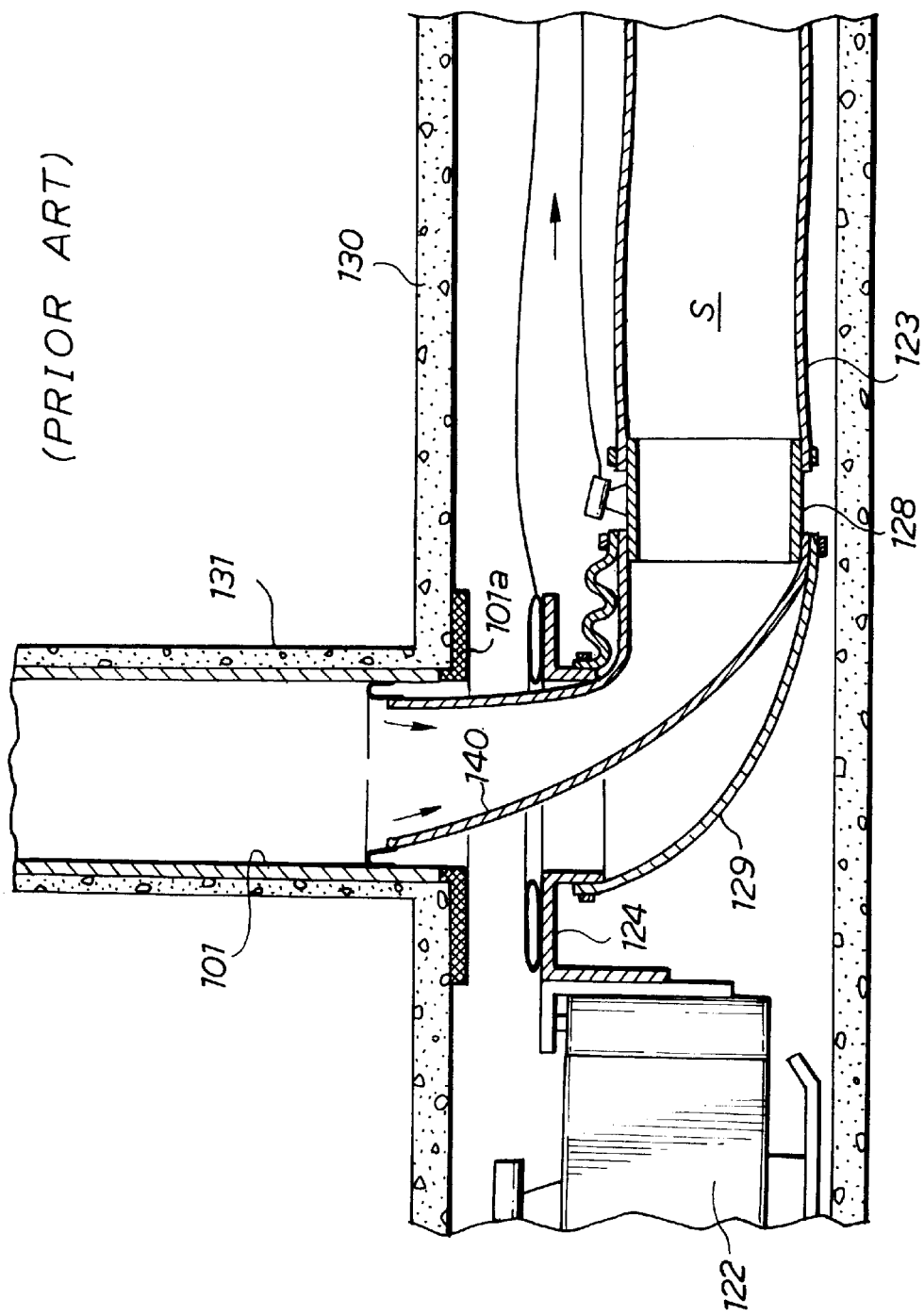

If the branch pipe 31 includes a curved portion, a large everting pressure approximately five to ten times higher than that required for passing the branch pipe liner bag 1 through a straight portion of a branch pipe is required for passing the branch pipe liner bag 1 through the curved portion. For this reason, the compressed air in the closed space S is increased when the branch pipe liner bag 1 is passed through the curved portion such that the increased pressure drives the branch pipe liner bag 1 through the curved portion. In this event, since the separable tube 8 is attached to the flange 1A instead of temporarily adhered as is the case of the conventional separable tube 140 (see FIGS. 16 and 17), the separable tube 8 will not be torn off or broken even if the high pressure acts thereto. Since a highly air-tight sealing is ensured in the closed space S, the branch pipe liner bag 1 is reliably everted and inserted into the branch pipe 31 once the branch pipe liner bag 1 has been completely everted and inserted into the branch pipe 31 as illustrated in FIG. 11, the tubular resin-absorbent material 2 of the branch pipe liner bag 1 is pressed onto the inner wall of the branch pipe 31 with this state maintained, as the branch pipe liner bag 1 is heated by an appropriate heat medium such as hot air, steam or the like, the branch pipe liner bag 1 is heated to harden the thermosetting resin impregnated therein. Thus, the inner wall surface of the branch pipe 31 is lined with the hardened tubular resin-absorbent material 2, and the branch pipe 31 is repaired.

Figure 12:
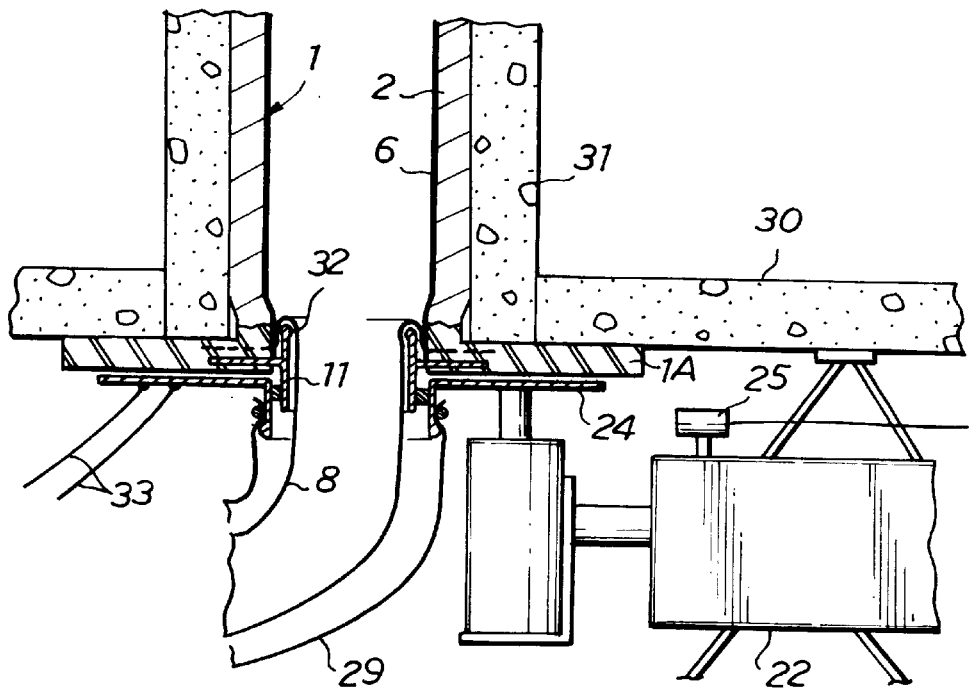
Figure 13:
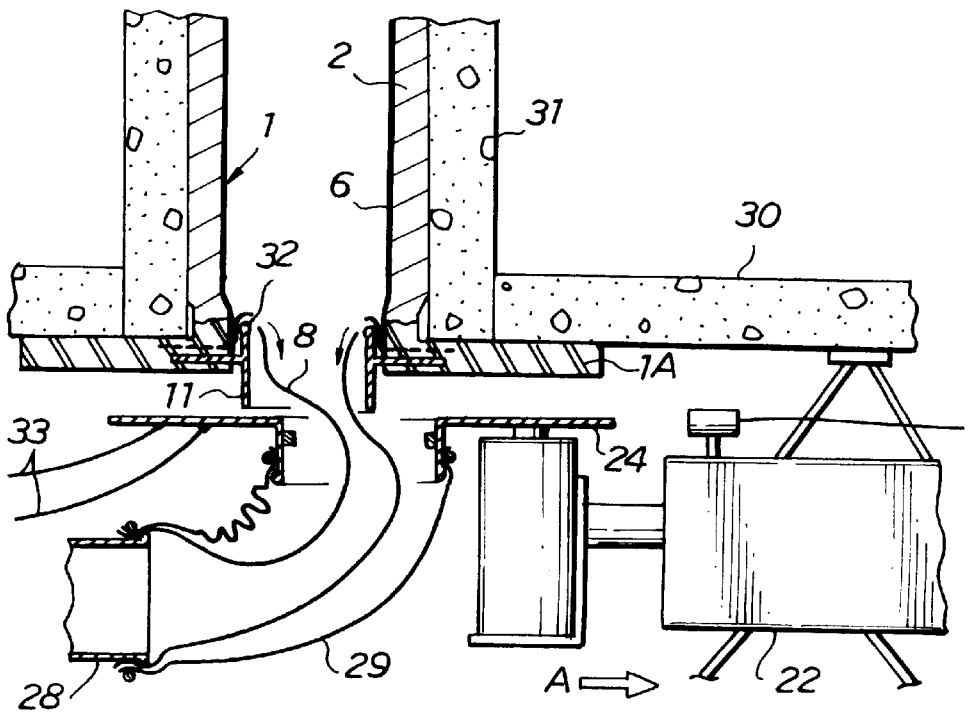

During the hardening of the branch pipe liner bag 1, the plastic film 6 covering the tubular resin-absorbent material 2 is heated and therefore softened by the heat medium and heat generated when the thermosetting resin is hardened. However, since the separable tube 8 is attached to the previously hardened flange 1A, the branch pipe liner bag 1 is free from any troubles such as the softened plastic film 6 peeled torn off by the separable tube 8, or the like. Since the highly air-tight sealing is ensured in the closed space S, the tubular resin-absorbent material 2 of the branch pipe liner bag 1 is firmly pressed onto the inner wall of the branch pipe 31 and brought into close contact thereto by the inner pressure of the closed space S once the branch pipe 31 has been lined with the hardened branch pipe liner bag 1 and repaired as described above, a heater 32, attached on the top surface of the anti-piercing protector 11, is electrically conducted through an electrical cable 33, as illustrated in FIG. 12. This causes the heater to generate heat which heats and melts the separable tube 8. Then, the-collar 24 is moved downward to be separated from the flange 1A of the branch pipe liner bag 1, as illustrated in FIG. 13. Subsequently, as the robot 22 is pulled in a direction indicated by an arrow A, the separable tube 8 is also pulled and cut away from the heated portion, and removed from the main pipe 30 together with the robot 22, the pressure bag 23 and so on, thus completing a sequence of lining operations for the branch pipe.

Figure 14:
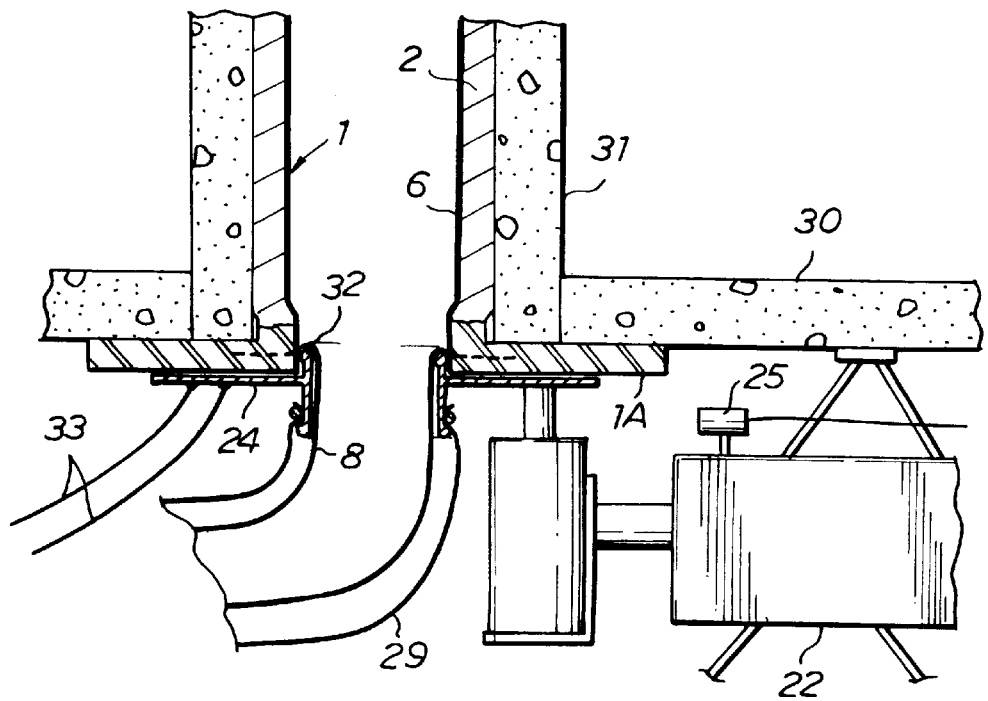
FIGS. 14 and 15 are partial cross-sectional views illustrating other implementations of a method of cutting a separable tube.
Figure 15:
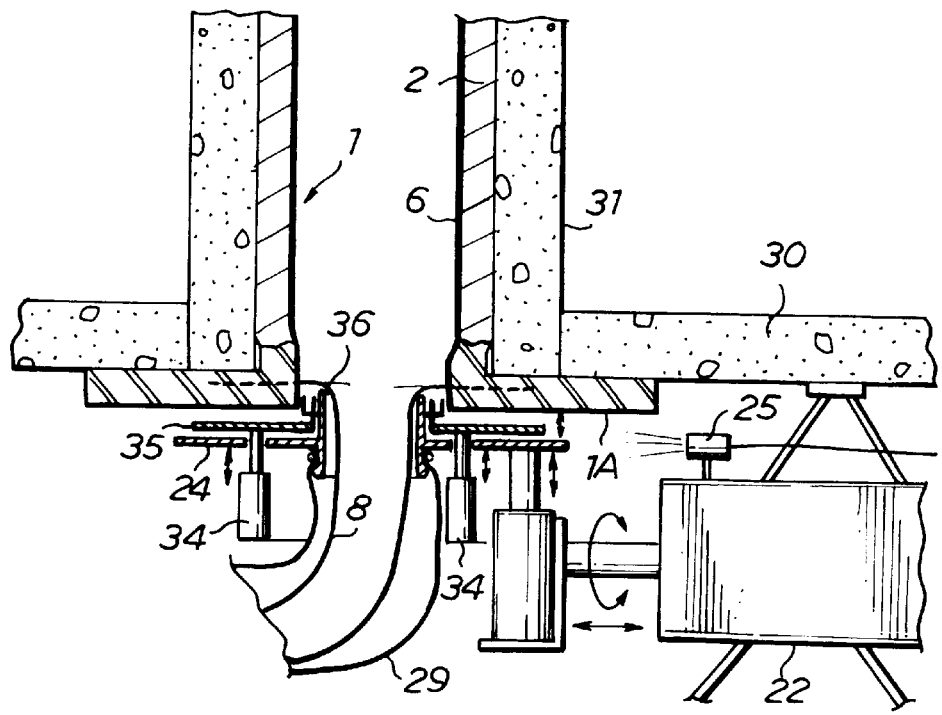

It is contemplated, as an alternative method of cutting the separable tube 8, that the heater 32 attached on the top surface of the collar 24 is electrically conducted through the electric cable 33 to be heated (when the anti-piercing protector is not provided) as illustrated in FIG. 14. It is also contemplated that a cylindrical cutter 36 is attached on an elevator base 35 supported by a plurality of hydraulic cylinders 34, as illustrated in FIG. 15, such that the elevator base 35 and the cutter 36 attached thereto are moved upward by the hydraulic cylinders 34 to cut the separable tube 8 with the cutter 36. Still other methods would occur to those skilled in the art. If a portion of the separable tube 8, to be torn off, is provided with a smaller tensile strength than other portions, the separable tube 8 can be cut from the smaller tensile strength portion only by pulling the separable tube 8. Further alternatively, hot air may be introduced into the branch pipe 31 to heat and soften the separable tube, so that the separable tube 8 is cut from a predetermined site.

It should be noted, in this invention, that other fluids such as water can be used instead of air to evert and insert the branch pipe liner bag into the branch pipe.

As will be apparent from the foregoing description, according to this invention, the separable tube is attached to the previously hardened flange of the branch pipe liner bag, so that the separable tube will never be torn or cut even if the branch pipe liner bag is everted and inserted into a branch pipe having a curved portion with a high fluid pressure or even if the film covering the branch pipe liner bag is heated and therefore softened by a heat medium or heat generated by the hardening of the thermosetting resin. It is therefore possible to reliably line a branch pipe even having a curved portion, using the branch pipe liner bag of the invention, and repair the branch pipe.

While this invention has been described in connection with its preferred embodiments, it is to be understood that various modifications will occur to those skilled in the art without departing from the spirit of the invention. The scope of this invention is therefore to be determined solely by the appended claims.

What is claimed is:

1. A branch pipe liner bag comprising a tubular resin-absorbent material having a flange formed at one end thereof, the outer surface of said tubular resin-absorbent material being covered with a fluid-tight film, said tubular resin-absorbent material being impregnated with an unhardened hardenable resin and a separable tube attached to said flange.

2. A branch pipe liner bag as set forth in claim 1 wherein said tubular resin-absorbent material has one end folded outwardly, said hardenable resin impregnated in said folded portion being hardened to integrally form said flange.

3. A branch pipe liner bag as set forth in claim 1 wherein said separable tube has one end folded outwardly, said folded portion being bonded to said flange of said tubular resin absorbent material, and the hardenable resin impregnated in said folded portion and said flange is hardened to secure the one end of said separable tube to said flange.

4. A branch pipe liner bag as set forth in claim 1 wherein said separable tube has one end folded outwardly, said folded portion being sandwiched between said flange of the tubular resin-absorbent material and the resin-absorbent material, and the hardenable resin impregnated therein is hardened to secure the one end of said separable tube to said flange.

5. A branch pipe liner bag as set forth in claim 1 wherein said separable tube has one end folded outwardly, and said folded portion is adhered to said flange of said tubular resin-absorbent material.

6. A branch pipe liner bag as set forth in claim 1 further comprising a member attached to said flange of said tubular resin-absorbent material for holding the one end of said separable tube.

7. A branch pipe liner bag as set forth in claim 1 further comprising a member attached to said flange of said tubular resin-absorbent material, and wherein said separable tube has one end folded outwardly, said folded portion being sandwiched between said flange of said tubular resin-absorbent material and said member.

8. A branch pipe liner bag as set forth to claim 1 wherein said separable tube includes a portion which locally has a smaller tensile strength than the remaining portion thereof.

9. A branch pipe liner bag as set forth in claim 1 further comprising a cylindrical member attached to said flange for protecting an inner surface of a portion of said tubular resin-absorbent material adjacent to said flange.

10. A branch pipe liner bag comprising an outer tubular resin-absorbent material and an inner tubular resin-absorbent material both having a flange formed at one end thereof, both of the outer surface of said outer and inner tubular resin-absorbent materials being covered with a fluid-tight film, further both of the tubular resin-absorbent materials being impregnated with an unhardened hardenable resin and a separable tube attached to the flange of said inner tubular resin-absorbent material.

11. A branch pipe liner bag as set forth in claim 10 made by a method wherein the outer tubular resin-absorbent material is inserted into said inner material by fluid pressure.

12. A branch pipe liner bag as set forth in claim 11 wherein a unhardened hardenable resin is poured into said outer tubular resin-absorbent material and then everted into said inner tubular resin-absorbent material by the fluid pressure so that the unhardened hardenable resin is impregnated into both of the outer and inner tubular resin-absorbent materials.

13. A method for manufacturing a branch pipe liner bag comprising the steps of (1) preparing a first tubular resin-absorbent material and a second tubular absorbent material both having a flange formed at one end therof and both of the outer surface of said first and second tubular resin-absorbent materials being covered with a fluid-tight film, (2) stacking said flange of the second tubular resin-absorbent material on said flange of the first tubular resin-absorbent material, (3) impregnating both of said flanges with a unhardened hardenable resin and hardening them to form a single flange, (4) pouring a unhardened hardenable resin into said second tubular resin-absorbent material, (5) everting and inserting the second tubular resin-absorbent material into said first tubular resin-absorbent material by a fluid pressure so that the unhardened hardenable resin is impregnated into both of the first and second tubular resin-absorbent materials.

14. A method for manufacturing a branch pipe liner bag as set forth in claim 13 wherein said everting and inserting step further comprises the step of decompressing said first tubular resin-absorbent material at the other end thereof.

15. A method for manufacturing a branch pipe liner bag as set forth in claim 13 wherein a separable tube having one end folded outwardly is further prepared, next folded portion is stacked with said flanges of the first and second tubular resin-absorbent materials and then impregnated and hardened with both of the flanges.

16. A branch pipe lining method using a branch pipe liner bag having a tubular resin-absorbent material having a flange formed at one end thereof, the outer surface of said tubular resin-absorbent material being covered with a fluid-tight film, said tubular resin-absorbent material being impregnated with an unhardened hardenable resin, and a separable tube attached to said flange, said method comprising the steps of (1) fluid-tight coupling an open end of said separable tube of said branch pipe liner bag to an open end of a pressure bag to form a closed space within said pressure bag, (2) bringing said flange of said branch pipe liner bag into close contact with a periphery of a branch pipe opening of a main pipe, (3) supplying a pressurized fluid into said closed space, with said flange being fitted into said branch pipe opening, to evert and insert said branch pipe liner bag into the branch pipe from the main pipe toward the ground, (4) hardening the hardenable resin impregnated in said branch pipe liner bag with the inserted branch pipe liner bag being pressed onto an inner wall of the branch pipe and (5) separating said separable tube from the vicinity of said flange.

17. A branch pipe lining method as set forth in claim 16 wherein said separating step further comprises the step of partially heating said separable tube to cut said separable tube from a heated portion.

18. A branch pipe lining method as set forth in claim 16 wherein said separating step comprises the step of cutting said separable tube with a cutter.

19. A branch pipe lining method as set forth in claim 16 wherein a robot introduced into the main pipe brings said flange of said branch pipe liner bag into close contact with the periphery of said branch pipe opening of the main pipe and maintains the condition.

* * * * *